350-173

3-19-74 XR 3,798,354

United States Patent [19]

Asou

[11] 3,798,354

[45] Mar. 19, 1974

[54] COLOR RESOLVING OPTICAL SYSTEM FOR A COLOR TELEVISION CAMERA

[75] Inventor: Michiko Asou, Yokohama, Japan

[73] Assignee: Canon Kabushiki Kaisha, Tokyo, Japan

[22] Filed: Apr. 12, 1972

[21] Appl. No.: 243,196

[30] Foreign Application Priority Data

Apr. 17, 1971 Japan ............................... 46-24268

[52] U.S. Cl. .............................. 178/5.4 E, 350/173

[51] Int. Cl. ............................................ H04n 9/12

[58] Field of Search...... 350/162 R, 173; 178/5.4 E, 178/5.4 TC

[56] References Cited

UNITED STATES PATENTS

| | | | |
|---|---|---|---|
| 3,202,039 | 8/1965 | De Lang et al. | 350/173 |
| 3,610,818 | 10/1971 | Bachmann | 178/5.4 E |
| 3,659,918 | 5/1972 | Tan et al. | 178/5.4 E |
| 3,602,637 | 8/1971 | Katsuta et al. | 178/5.4 TC |
| 3,521,944 | 7/1970 | Kishikawa | 350/173 |

*Primary Examiner*—Richard Murray
*Attorney, Agent, or Firm*—Toren and McGeady

[57] ABSTRACT

A color resolving optical system for a color television camera which is characterized by that in a color resolving optical system for a color television camera being positioned between a photographing lens and color image pickup tubes, the system comprises three prisms, three prism planes of which are utilized, and one prism, two prism planes of which are utilized, and two dichroic mirrors provided at the planes where said prisms are adjoining together, wherein same number of reflections are made in each of three primary colors.

12 Claims, 1 Drawing Figure

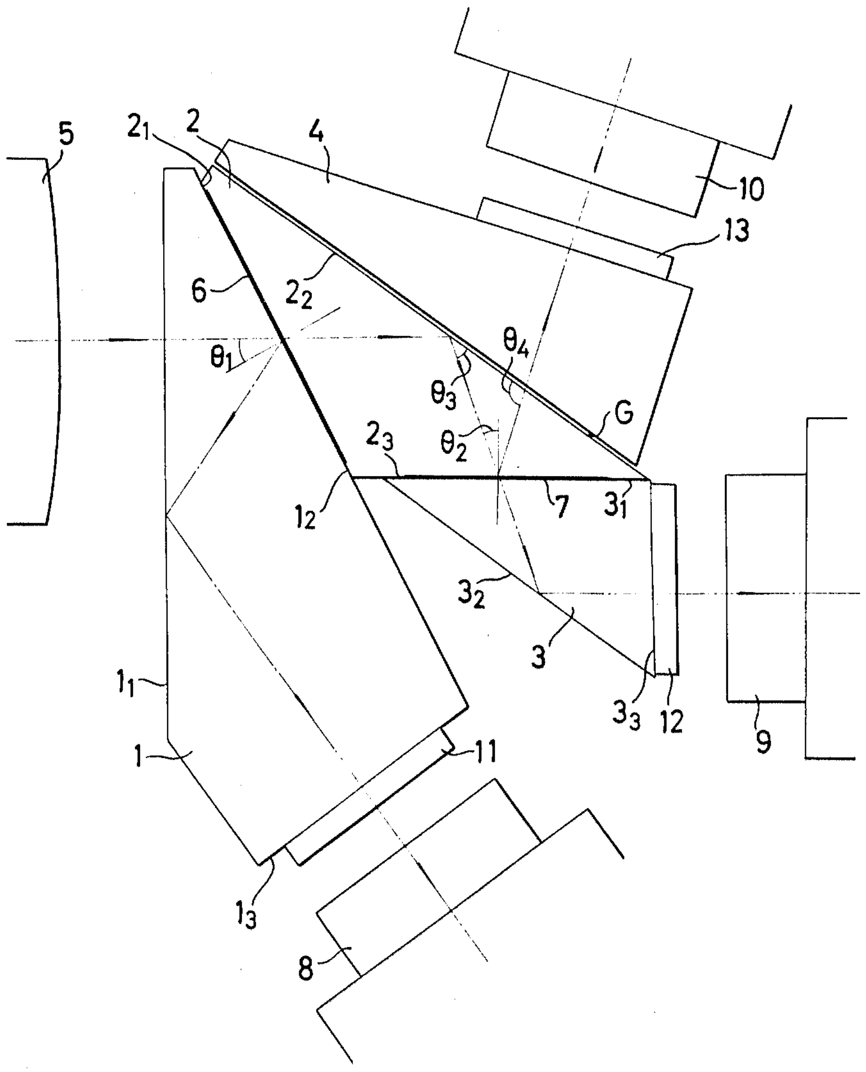
5
2₁
2
4
10
13
6
2₂
θ₁
θ₄
θ₃
θ₂
G
2₃
1₂
7
3₁
3₂
3
1₁
3₃
12
9
1
11
1₃
8

COLOR RESOLVING OPTICAL SYSTEM FOR A COLOR TELEVISION CAMERA

The present invention is intended, in a color resolving prism system for a color television camera, first to reduce the angle of incidence into a dichroic mirror for reducing deflection and color shading, secondly to allow incident ray of light to be resolved into three colors just behind an object lens without using a relay lens, thirdly to shorten the portion of the prism system through which ray of light passes, and fourthly to make the number of reflections of each colour channel uniform for preventing each one of them from forming a reflected image to each other.

Generally speaking when an angle of incidence into a dichroic mirror increases, the deflection characteristics of the dichroic mirror is suddenly deteriorated as said angles becomes larger. At a same time, the angle of incidence into a dichroic mirror so varies generally that the angle at center is different from that at marginal portion, and this difference in the angle of incidence causes deviations in the characteristics of reflection and transmission of the dichroic mirror, causing the white balance to go out of balance between the center and the marginal portion, and so called color shading phenomenon wherein color is white at the center, but it does not become white at the marginal portion will take place, which becomes suddenly great as the angle of incidence increases. Therefore, it is important for reducing deflection and reducing color shading to reduce the angle of incidence into the dichroic mirror. Also the use of a relay lens is apt to deteriorate the characteristics of a final image, making the registration difficult to be made correctly. Further, if the number of reflections of each color channel is different, it will be necessary to effect compensation electrically, which also makes the registration difficult.

If the various requirements mentioned are to be satisfied, a photographic object lens with a long back focal distance will be necessary, making the apparatus excessively large. The present invention is to satisfy said various requirements while the shortcomings mentioned are eliminated and to shorten the length of optical path within a prism, thus making the entire system compact.

Next, the arrangements and function of the prism system of the present invention shall be explained referring to the attached drawing which is a side elevation of the main part of a color resolving prism system in a color television system.

The main part of this prism system consists of four triangle prisms, 1, 2, 3 and 4, respectively called as first to fourth prisms, wherein a first plane $1_1$ of the first prism 1 is made perpendicular to an optical axis of an object lens 5 and is used as a plane of incidence, and the second plane $1_2$ of said prism and a first plane $2_1$ of the second prism 2 are put together, providing a first dichroic mirror 6 between said two planes, then a third plane $2_3$ of the second prism 2 and a first plane $3_1$ of the third prism 3 are put together providing a second dichroic mirror 7 between said two planes, then the fourth prism 4 is positioned with a narrow air gap G against a second plane $2_2$ of the second prism 2. 8, 9 and 10 are respectively a first, a second and a third image pickup tube, and each of 11, 12, 13 is trimming filter.

In the above mentioned apparatus the ray of light coming out of the object lens 5 enters into the first prism 1 perpendicularly at its first plane $1_1$ and is resolved into two different colors by the reflection and transmission by the first dichroic mirror 6, then its reflected ray of light is totally reflected at the first plane $1_1$ of the prism 1 and enters the first image pickup tube 8 from the third plane $1_3$ of the prism 1 after passing through the trimming filter 11. On the other hand, the ray of light transmitting through the first dichroic mirror 6 enters the second prism 2, and is first totally reflected at the second plane $2_2$ of the prism, then reaches the second dichroic mirror 7. Then said ray of light transmitting through this mirror enters the third prism 3, and is reflected at its second plane $3_2$, thereafter proceeds to the second image pickup tube 9 from the third plane $3_3$ of the prism after passing through the trimming filter 12. The ray of light reflected at the second dichroic mirror 7 passes through the second plane $2_2$ of the second prism 2 and the air gap G then enters the fourth prism 4, then goes into the third image pickup tube 10 after passing through the trimming filter 13. In the apparatus mentioned above, the third prism 3 performs to make the number of reflections and the length of optical path of one channel uniform with those of other channels, and at the same time functions to make the projection plane perpendicular to the optical axis. And the fourth prism 4 functions to make the projection plane perpendicular to the optical axis and to make the length of optical axis uniform with those of other channels. When the angle of incidence into the dichroic mirror is to be made smaller, the reflected ray of light takes up the same space with the incident light beam but a large portion of the space, therefore a long optical path is required in order to take out the reflected ray of light as it is. In the present invention the plane $1_1$ in the first prism 1 and the plane $2_2$ in the second prism 2 have such function that the former plane works as a transmission plane against the incident light beam, and as a totally reflecting plane against the light beam reflected from the dichroic mirror 6, while the latter plane works, contrary to the former plane, as a totally reflective plane against the incident light beam into the dichroic mirror 7 and as a transmission plane against the ray of light reflected from the same mirror, so that the length of optical path is shortened and the size of the prism is made small and further the angle of incidence is made small by causing the ray of light reciprocate between said planes.

In the prism system of the present invention which has such functions as mentioned above, when each of the angle of incidence into the first and second dichroic mirrors is represented by $\theta_1$, $\theta_2$, respectively, and the angle made by the incident optical axis at the second prism 2 and its totally reflective plane, i.e. $2_2$ is represented by $\theta_3$, further the angle made by the optical axis of the ray of light reflected at the second dichroic mirror and the projection plane of the second prism 2, i.e., $2_2$ is represented by $\theta_4$, each one of said angles must satisfy the condition mentioned below, wherein the refractive index of the prism is expressed as $n$, and the F-value of an object lens is expressed as F. That is, $\theta_1$ must satisfy the following formula in order to have the ray of light reflected at the first dichroic mirror totally reflected at the first plane $1_1$ of the first prism 1:

$$\theta > \tfrac{1}{2}\,[\arcsin(1/n) + \arcsin(1/n)(1/2F)]$$

And when $n$=1.5, $F$=1.6, the $\theta$ can be made so small as down to 27°. $\theta_2$ will be explained hereinafter. $\theta_3$ must satisfy the following formula in order to have the incident ray of light totally reflected at the second plane $2_2$ of the second prism 2:

$$90° - \theta_3 - \arcsin [ (1/n) (1/2F)] > \arcsin (1/n)$$

$\theta_4$ must satisfy the following formula in order to have the ray of light reflected from the second dichroic mirror transmit through the second plane $2_2$ of the second prism 2 instead of being totally reflected:

$$\theta_4 - 90° + \arcsin [(1/n) (1/2F)] > \arcsin (1/n)$$

Now, as being apparent from the drawing since $$\theta_3 + 2\theta_2 + \theta_4 = 180°$$

$\theta_2$ is defined as $$\theta_2 > \arcsin [(1/n) (1/2F) ]$$

and when $n$=1,5, $F$=1.6, $\theta_2$ can be made as small as down to 12.1°.

It will be known from the above explanation that in the present invention the angle of incidence into the dichroic mirror can be made small and the prisms can be made small.

What is claimed is:

1. A color resolving optical system, comprising a first prism having a first plane and a second plane and a third plane, a second prism having a first plane and a second plane and a third plane, a third prism having a first plane and second plane and a third plane, the second plane of said first prism and the first plane of said second prism having a dichroic layer sandwiched between them, said third plane of said second prism and said first plane of said third prism having a dichroic layer sandwiched between them, said planes having respective angles such that when said first plane of said first prism is located in the path of multi-colored light said first dichroic layer reflects one spectrum of colors interiorly back toward said first plane of said first prism and said first plane of said first prism interiorly reflects the incident light through said third plane of said first prism, said planes further having angles such that light transmitted by said first dichroic layer is interiorly reflected by said second plane of said second prism toward said second dichroic layer at an angle such that said second dichroic layer reflects a second spectrum of said multi-colored light back toward said second plane of said second prism and transmits the remaining spectrum toward said second plane of said third prism, said angles of said planes being such that said second plane of said third prism interiorly reflects the remaining spectrum through said third plane of said third prism, whereby light projected through said third plane of said first prism is reflected by said first dichroic layer and said first plane of said first prism and light projected by said second plane of said second prism has been reflected by said second plane of said second prism and said second dichroic layer and light projected by said third plane of said third prism has been reflected by said second plane of said second prism and said second plane of said third prism so that the light trasmitted by each of said prisms has been twice reflected.

2. A system as in claim 1, wherein the angle of incidence $\theta_1$ at which the light impinges upon the first dichroic layer follows the rule, $$\theta_1 > ½ [\arcsin (1/n) + \arcsin (1/n) (1/2F) ]$$

where $n$ is the refractive index of the prism and $F$ is the aperture ratio of an objective lens with which light is directed toward the system.

3. A system as in claim 2, wherein the angle of incidence $\theta_2$ at which light from the second plane of the second prism impinges upon the second dichroic layer follows the rule $$\theta_2 > \arcsin [(1/n) (1/2F) ]$$

4. A system as in claim 3, wherein the angle $\theta_4$ relative to the plane at which light from the third plane of said second prism strikes the second plane of said second prism follows the rule $$\theta_4 - 90° + \arcsin [(1/n) (1/2F)] < \arcsin (1/n)$$

5. A system as in claim 4, wherein the angle $\theta_3$ relative to the plane at which light leaves the second plane of second prism for the third plane of the second prism follows the rule $$90° - \theta_3 - \arcsin [(1/n) (1/2F)] > \arcsin (1/n)$$

6. A color resolving optical system, comprising a first prism block having an incident and reflective plane and a transmissive plane as well as a projection plane; a second prism block having an incident plane, a reflection and projection plane, and a transmissive plane; a first dichroic layer positioned between the transmissive plane of the first block and the incident plane of said second block, a third prism block having an incident plane and a reflection plane and a projection plane, a second dichroic layer positioned between a transmissive plane of the second prism block and the incident plane of the third prism block, the light projected from the projection plane of the first block being the light twice reflected by the first dichroic layer and the incident plane of the first block, the light projected from the reflection and projection plane of the second prism block being light twice reflected by the reflection and the projection plane of the second block and the second dichroic layer, the light projected from the projection plane of the third block being the light twice reflected by the reflection and projection plane of the second block and the reflection plane of the third block.

7. A system as in claim 6, wherein the first dichroic layer has an inclination with respect to the optical axis of incident light from the incident and reflection plane of the first prism block and the light reflected by the first dichroic layer is directed to the incident and reflection plane of the first prism block.

8. A system as in claim 6, wherein the reflection and projection plane of the second prism block has an inclination with respect to the optical axis of the light transmitted through the first dichroic layer.

9. A system as in claim 6, further comprising a fourth prism block located opposite the reflection and projection plane of the second prism block and leaving an air space between said second prism block and said fourth prism block for correcting the light path of the light reflected by said second dichroic layer.

10. A system as in claim 9, wherein the projection planes of said first, third and fourth prism blocks are perpendicular to the light flux impinging thereon.

11. An optical system, comprising a first prism having an incident plane and a transmissive plane with an inclination with respect to the optical axis of light incident upon the incident plane, a second prism having an incident plane with the same inclination as the transmissive plane of the first prism, a reflection and projection plane having an inclination in the same direction as that of the incident plane of said second prism and having a transmissive plane, a first dichroic layer provided between the transmissive plane of said first prism and the incident plane of said second prism, a third prism having an incident plane opposite to the transmissive plane of the second prism, and a second dichroic layer located between the transmissive plane of the second prism and the incident plane of the third prism.

12. A three color resolving television camera, comprising an objective lens, three television image tubes, and a three color resolving prism system; said prism system having first and second and third prisms, said first and second prisms being joined through a dichroic layer and said second and third prisms being joined through a second dichroic layer, said layers and said prisms having relationships such that light from the objective lens which falls incident to the two dichroic layers is transmitted through the two dichroic layers and is directed to one of three image tubes, said second prism having a plane for reflecting light from said first layer to said second layer.

* * * * *